(12) United States Patent
Wang et al.

(10) Patent No.: US 12,405,829 B2
(45) Date of Patent: Sep. 2, 2025

(54) RESOURCE UTILIZATION EFFICIENCY BASED JOB SCHEDULING

(71) Applicant: International Business Machines Corporation, Armonk, NY (US)

(72) Inventors: Xiao Dong Wang, Beijing (CN); Pei Ci Fang, Beijing (CN); Xiao Ping Zheng, Beijing (CN); Jia Bin Liao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 501 days.

(21) Appl. No.: 17/654,425

(22) Filed: Mar. 11, 2022

(65) Prior Publication Data
US 2023/0289231 A1 Sep. 14, 2023

(51) Int. Cl.
*G06F 9/50* (2006.01)
*G06F 9/48* (2006.01)
*G06F 11/34* (2006.01)

(52) U.S. Cl.
CPC .......... *G06F 9/5038* (2013.01); *G06F 9/4881* (2013.01); *G06F 9/5077* (2013.01);
(Continued)

(58) Field of Classification Search
None
See application file for complete search history.

(56) References Cited

U.S. PATENT DOCUMENTS 8,087,026 B2  12/2011  Zhong
8,332,863 B2 * 12/2012  Zhong ................ G06F 9/505
                                                      718/104
(Continued)

FOREIGN PATENT DOCUMENTS

CN  109408229 A  3/2019
CN  111813564 A  10/2020
(Continued)

OTHER PUBLICATIONS

International Search Report and Written Opinion dated May 24, 2023, for International Application No. PCT/CN2023/079574, filed Mar. 3, 2023, total pp. 7.
(Continued)

*Primary Examiner* — Mustafa A Amin
(74) *Attorney, Agent, or Firm* — Erik A. Huestis; Katherine L. Baker; Foley Hoag LLP

(57) ABSTRACT

Computer-implemented methods, systems and computer program products for job scheduling in a computing system are provided. The computing resources of the computing system is allocated to one or more users of the computing system using a predefined policy. The method comprises receiving, by a job scheduler associated with the computing system one or more resource utilization scores of the one or more users, each of the one or more resource utilization scores indicating resource utilization efficiency over time at a job level for the one or more users. The method comprises receiving, by the job scheduler, one or more jobs submitted by the one or more users. The method further comprises scheduling, by the job scheduler, the received one or more jobs based on the predefined policy and further on the received one or more resource utilization scores of the one or more users.

14 Claims, 6 Drawing Sheets

(52) U.S. Cl.
CPC .... *G06F 11/3409* (2013.01); *G06F 2209/501* (2013.01); *G06F 2209/508* (2013.01)

(56) References Cited

U.S. PATENT DOCUMENTS

| | | | |
|---|---|---|---|
| 9,430,288 | B2 | 8/2016 | Wilson et al. |
| 10,938,674 | B1 | 3/2021 | Natanzon |
| 2007/0143765 | A1 | 6/2007 | Aridor et al. |
| 2015/0199218 | A1* | 7/2015 | Wilson .................. G06F 9/5011 718/104 |
| 2019/0317849 | A1* | 10/2019 | Cmielowski ........ G06F 11/0772 |
| 2020/0133726 | A1 | 4/2020 | Curino |
| 2020/0151025 | A1* | 5/2020 | Kinney, Jr. ........... G06F 9/4881 |
| 2020/0326979 | A1 | 10/2020 | Seshiah |
| 2020/0326982 | A1 | 10/2020 | Jha |
| 2021/0019179 | A1 | 1/2021 | Yadav |

FOREIGN PATENT DOCUMENTS

| | | |
|---|---|---|
| CN | 112930524 A | 6/2021 |
| WO | 2023/169329 A1 | 9/2023 |

OTHER PUBLICATIONS

Anonymous, "Method for dynamically setting batch job memory resource requirements based on historical usage and user suggestion," https://priorart.ip.com/IPCOM/000179647, an IP.com Prior Art Database Technical Disclosure, IP.com No. IPCOM000179647D, Feb. 19, 2009, 5 pgs.

Anonymous, "System and Method to Score User on Usage of Heterogenous Resources," htttps://priorart.ip.com/IPCOM/000263334, an IP.com Prior Art Database Technical Disclosure, IP.com No. IPCOM000263334D, Aug. 19, 2020, 6 pgs.

Dharani et al., "Efficient Resource Allocation and Scheduling in Cloud Computing Environment," International Journal of Research in Computer Applications and Robotics, ISSN 2320-7345, vol. 4, Issue 3, pp. 48-55, Mar. 2016, https://www.ijrcar.com/Volume_4_Issue_3/v4i316.pdf.

Gawali et al., "Task scheduling and resource allocation in cloud computing using a heuristic approach," Journal of Cloud Computing: Advances, Systems and Applications (2018) 7:4, https://journalofcloudcomputing.springeropen.com/articles/10.1186/s13677-018-0105-8, 16 pgs.

Jain et al., "An Efficient Resource Utilization Based Integrated Task Scheduling Algorithm," 2017 4th International Conference on Signal Processing and Integrated Networks (SPIN), https://ieeexplore.ieee.org/document/8050005, © 2017 IEEE, pp. 519-523.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

| Time Frame | UserID | JobID | Job Status | Job Run Time (S) | Resource Time (S) | UtScore |
|---|---|---|---|---|---|---|
| 1 | A | 1 | 1 | 170 | 200 | 0.85 |
|   | B | 2 | 1 | 300 | 400 | 0.75 |
|   | B | 3 | 0 | 200 | 300 | 0.00 |
|   | A | 4 | 1 | 190 | 200 | 0.95 |
|   | A⋯B⋯ |   |   |   |   |   |
| 2 | B | 5 | 1 | 100 | 150 | 0.67 |
|   | A | 6 | 1 | 150 | 200 | 0.75 |
|   | A | 7 | 1 | 100 | 120 | 0.83 |
|   | B | 8 | 0 | 0 | 5 | 0.00 |
|   | A | 9 | 1 | 200 | 250 | 0.80 |
|   | A⋯B⋯ |   |   |   |   |   |

RESOURCE UTILIZATION EFFICIENCY BASED JOB SCHEDULING

BACKGROUND

The present application relates to computing, and more specifically, to methods, systems, and computer program products for job scheduling.

Cloud computing is on-demand access, via the internet, to computing resources—applications, servers (physical servers and virtual servers), data storage, development tools, networking capabilities, and more—hosted at a remote data center managed by a cloud services provider. The cloud service provider makes these resources available for a monthly subscription fee or bills them according to usage. Being an adaptable technology, cloud computing is an excellent alternative for organizations for forming their own private cloud. Since the resources are limited in these private clouds, maximizing the utilization of resources, and giving the guaranteed service for the user are the ultimate goal. In IaaS cloud, the resources (compute capacity and storage) are provided in the form of virtual machines to users. The objective is to minimize underutilizations of the underlying infrastructure ensuring effective efficiency. To this end, resource management and scheduling can be the mechanism to do so. The primary challenge of scheduling in a cloud environment is the allocation of available resources effectively thereby improving efficiency of the whole cloud computing environment. However, job schedulers nowadays allocate resources for queued jobs submitted by multi-users based on a predefined resource allocation policy—typically fair-share policy—which may not result in high efficiency in most scenarios.

For the reasons mentioned above, an enhanced job scheduling scheme is needed.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus, and/or computer program products for data recovery are described.

In an example embodiment, a computer-implemented method for job scheduling in a computing system is provided. The computing resources of the computing system is allocated to one or more users of the computing system using a predefined policy. The computer-implemented method comprises receiving, by a job scheduler associated with the computing system (e.g., such that the job scheduler is a fully autonomous computing system comprising software and/or hardware) one or more resource utilization scores of the one or more users, each of the one or more resource utilization scores indicating resource utilization efficiency over time at a job level for the one or more users. The computer-implemented method comprises receiving, by the job scheduler, one or more jobs submitted by the one or more users. The computer-implemented method further comprises scheduling, by the job scheduler, the received one or more jobs based on the predefined policy and further on the received one or more resource utilization scores of the one or more users.

In another example embodiment, a job scheduler for job scheduling in a computing system is provided, wherein computing resources of the computing system is allocated to one or more users of the computing system using a predefined policy, the job scheduler comprising program instructions, when executed by one or more processing units in the computing system, causing the one or more processing units to receive one or more resource utilization scores of the one or more users, each of the one or more resource utilization scores indicating resource utilization efficiency over time at a job level for the one or more users. The job scheduler further comprises program instructions, when executed by one or more processing units in the computing system, causing the one or more processing units to receive one or more jobs submitted by the one or more users. The job scheduler comprises program instructions, when executed by one or more processing units in the computing system, causing the one or more processing units to schedule the received one or more jobs based on the predefined policy and further on the received one or more resource utilization scores of the one or more users.

In other example embodiments, corresponding computer program products are also provided. A computer program product for job scheduling in a computing system, wherein computing resources of the computing system is allocated to one or more users of the computing system using a predefined policy, the computer program product comprising a non-transitory computer readable storage having program instructions embodied therewith and the program instructions comprising program codes configured to receive, by a job scheduler associated with the computing system one or more resource utilization scores of the one or more users, each of the one or more resource utilization scores indicating resource utilization efficiency over time at a job level for the one or more users. The program instructions comprise program codes configured to receive, by the job scheduler, one or more jobs submitted by the one or more users. The program instructions further comprise program codes configured to schedule, by the job scheduler, the received one or more jobs based on the predefined policy and further on the received one or more resource utilization scores of the one or more users.

These and other features and/or advantages will be described in, or will become apparent to those of ordinary skill in the art in view of, the following detailed description of the example embodiments of the present disclosure.

BRIEF DESCRIPTION OF THE DRAWINGS

The following detailed description, given by way of example and not intended to limit the disclosure solely thereto, will best be appreciated in conjunction with the accompanying drawings, in which.

The drawings are not necessarily to scale. The drawings are merely schematic representations, not intended to portray specific parameters of the disclosure. The drawings are intended to depict only typical embodiments of the disclosure. In the drawings, like numbering represents like elements.

DETAILED DESCRIPTION

Figure 1:
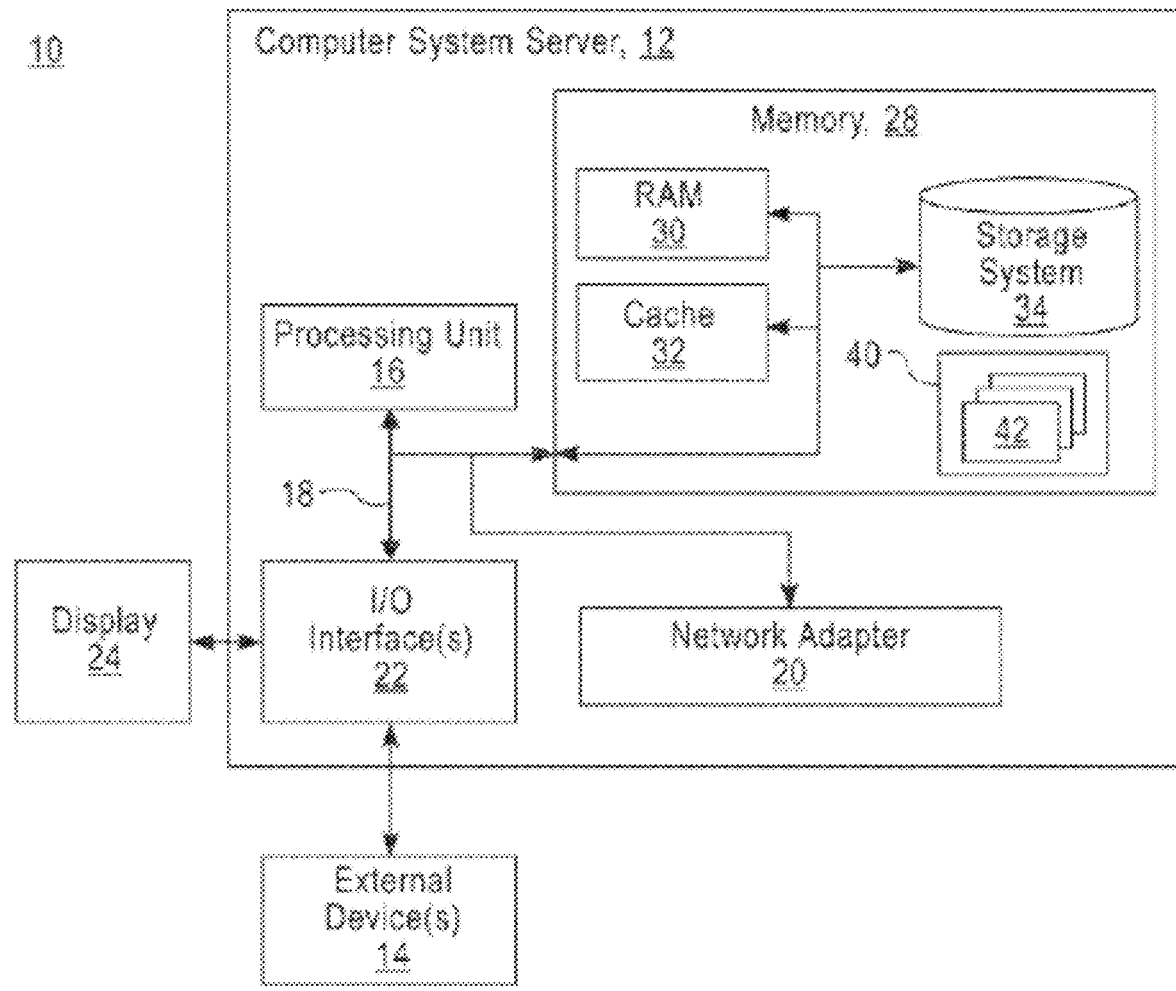
FIG. 1 depicts a cloud computing node according to some embodiments in the present disclosure.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments of the present disclosure may be implemented with, however not limited to, a cloud computing environment which will be described in the following.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to an embodiment of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
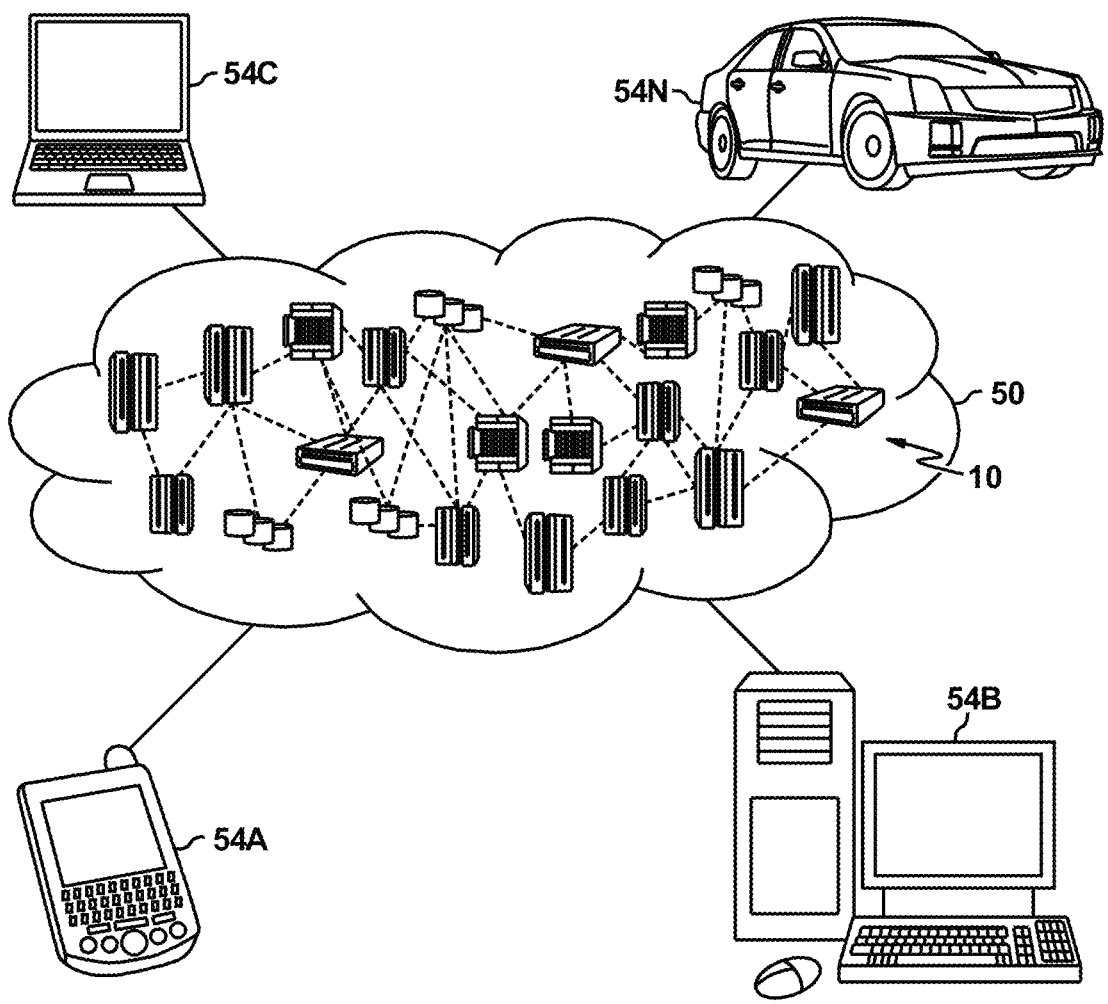
FIG. 2 depicts a cloud computing environment according to some embodiments in the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
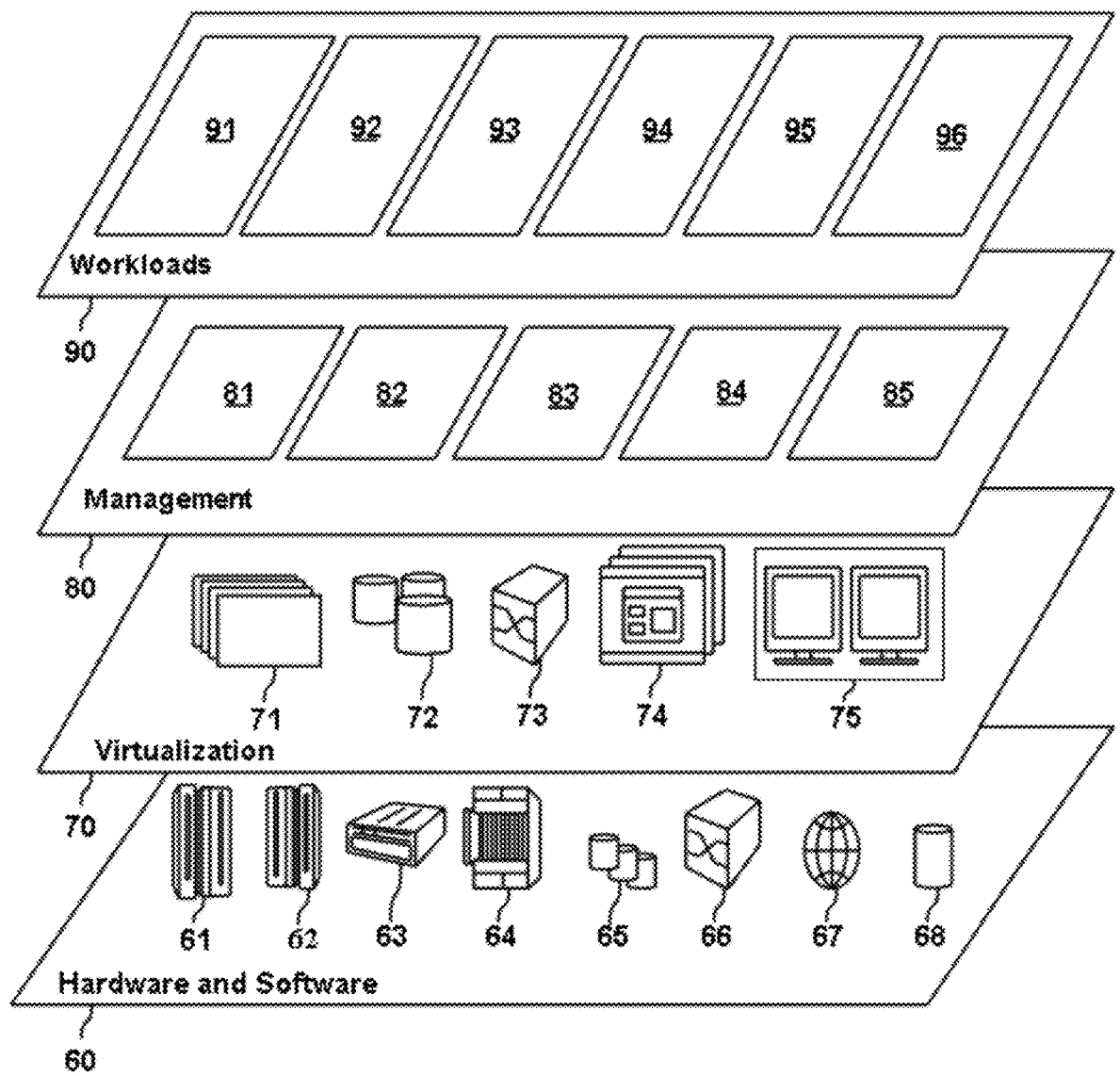
FIG. 3 depicts abstraction model layers according to some embodiments in the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. The management layer 80 may also provide the job scheduling management according to embodiments in the present disclosure.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and job scheduling 96.

As stated in the Background, maximizing the utilization of resources in a private cloud and giving the guaranteed service for the user can be beneficial due to the fact that resources are limited in a private cloud. However, job schedulers can allocate resources for queued jobs submitted by multi-users based on a predefined resource allocation policy.

An example of such a predefined policy is a fair-share scheduling policy. With fair-share scheduling policy, resources are allocated to queued jobs submitted by a plurality of users fairly. The fair treatment to the plurality of users, however, sometimes may lead to low resource utilization efficiency resulting from the fact that the characteristics of jobs from different users may be drastically different from each other. The differences in the characteristics of jobs from different users may lead to, at the job level, differences in utilization efficiency of the allocated resources. For example, the reserved allocated resource for a user may not be used eventually, which results in a waste while jobs from other users may be still waiting for responses from the job scheduler. In another scenario, resources allocated to problematic jobs of a user are also wasted if jobs from the user run into problems due to an application error. If the time scheduled for a job is much bigger than the actual running time of the job, the time left after the completion of the job is also wasted.

To tackle the problem stated in the above, embodiments in the present disclosure provide enhanced job scheduling by considering resource utilization efficiency at the job level such that differences in respective utilization efficiencies of allocated resources for different jobs may be considered aside from the predefined policy, which may produce better scheduling by allocating more resources to a user that can better utilize the allocated resources.

To provide such enhanced job scheduling, embodiments in the present disclosure may collect resource utilization data for a user at the job level and calculate a resource utilization score for the user based on the collected resource utilization data. The resource utilization score may indicate the resource utilization efficiency over time for the user at the job level. According to some embodiments in the present disclosure, calculated resource utilization scores may be utilized in connection with the predefined policy in scheduling, such that resource allocation decision may consider differences in respective utilization efficiencies against allocated resources for different jobs to avoid over-allocation or starvation.

In the following, embodiments in the present disclosure will be discussed in detail with references to the accompanying FIGS. 4 to 6.

Figure 4:
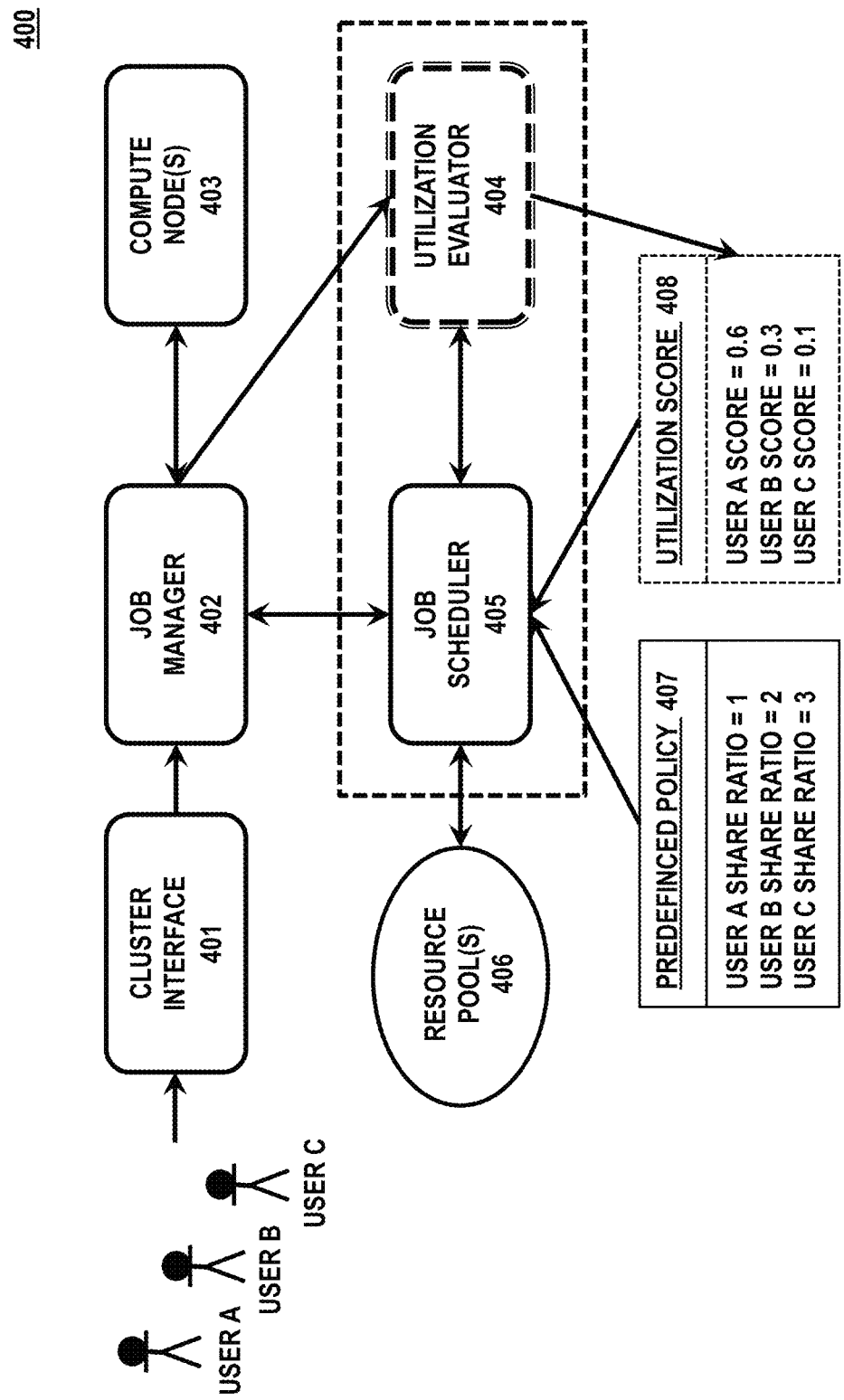
FIG. 4 depicts an exemplary system architecture according to some embodiments in the present disclosure.

Referring to FIG. 4, which depicts an exemplary system architecture 400 according to some embodiments in the present disclosure. According to some embodiments in the present disclosure, the exemplary system 400 may be located within or associated with the cloud computing environment 50 of FIG. 2. The exemplary system 400 may comprise a cluster interface 401, a job manager 402, one or more compute nodes 403, a utilization evaluator 404, a job scheduler 405 and one or more resource pools 406.

According to some embodiments in present disclosure, the cluster interface 401 may be in the form of graphic user interface (GUI), a command line interface (CLI) or any other suitable interfaces that configured as the interface between one or more users (User A, User B, User C, . . . ) of the system 400 and the system 400 itself. According to some embodiments in present disclosure, the exemplary system 400 may receive, via the cluster interface 401, one or more jobs submitted by the one or more users of the system 400. According to some embodiments in present disclosure, the cluster interface 401 may be coupled to the job manager 402 and submit the one or more jobs submitted by the one or more users of the system 400 to the job manager 402. The exemplary system 400 may further provide, via the cluster interface 401, execution results of the one or more jobs received from the job manager 402 to the one or more users of the system 400.

According to some embodiments in the present disclosure, the exemplary system 400 may comprise one or more compute nodes 403. A compute node of the one or more compute nodes 403 may provide a collection of resources that supply the processing, memory, network and storage consumed by virtual machine instances. When an instance is created, the instance may be matched to a compute node with the available resources. A compute node may host multiple instances until all of its resources are consumed. According to some embodiments in present disclosure, the one or more compute nodes 403 may be mapped to respective available resources managed by the one or more resource pools 406. According to some embodiments in present disclosure, the one or more compute nodes 403 may be coupled to the job manager 402 and jobs submitted by the one or more users of the system 400 may be dispatched onto the one or more compute nodes 403 to execute.

According to some embodiments in present disclosure, the job manager 402, also known as workload manager, may be configured to perform, for the jobs, e.g., lifecycle management, job dispatching, resource monitoring, resource management. etc. A job submitted to the exemplary system 400 from a user may consist of two primary parts: a set of resource directives (such as resources needed, e.g., the amount of memory or the number of CPUs) and a description of the job to be executed. This description contains all the information the exemplary system 400 needs in order to start the job of the user when the time comes. For instance, the job description may contain information such as the name of the file to execute, a list of data files required by the job, and environment variables or command-line arguments to pass to the executable. Once submitted to the exemplary system 400, jobs are held in a queue until the matching resources (e.g., a compute node of the one or more compute nodes 403 satisfies the resource requirement stated out in the resource directives of the job) become available. According to some embodiments in present disclosure, the job manager 402 may be coupled to the job scheduler 405, receiving resource allocation decisions for respective jobs from the job scheduler 405 and dispatching jobs to respective allocated resources (managed by the one or more resource pools 406 and mapped to the one or more compute nodes 403) to execute.

According to some embodiments in present disclosure, the utilization evaluator 404 may be coupled to the job manager 402 and be configured to collect resource utilization data for a user at the job level from the job manager 402 and calculate corresponding resource utilization score for the user. The resource utilization score may indicate the resource utilization efficiency over time for the user at the job level. The utilization evaluator 404 may also be configured to feed the calculated resource utilization score to the job scheduler 405. According to some embodiments in present disclosure, resource utilization data for a user at the job level may comprise job statuses and job run time information of those jobs with a final state (e.g., successfully completed, aborted, or failed). Embodiments in the present disclosure will be discussed with job status and job run time information as resource utilization data, however, any other types of resource utilization data at the job level may be utilized. The collection of resource utilization data and the calculation of resource utilization scores will be discussed later with reference to FIGS. 5A and 5B.

According to some embodiments in present disclosure, the job scheduler 405 may be configured to schedule jobs submitted by the users of the exemplary system 400 based on a predefined policy and further on resource utilization scores according to some embodiments in the present disclosure, mapping jobs to suitable available resources such that the job manager 402 may dispatch the jobs to the suitable available resources. The job scheduler 405 may be configured to send the resource allocation decisions for respective jobs to the job manager 402. According to some embodiments in present disclosure, the predefined policy may be a fair-share policy. In FIG. 4, the utilization evaluator 404 is shown with a different line compound type (i.e., dashed) to indicate that the utilization evaluator 404 as a distinct component compared with existing approaches for job scheduling. However, it should not be interpreted as though the utilization evaluator 404 is the only difference from existing approaches.

The dashed box surrounding the job scheduler 405 and the utilization evaluator 404 in FIG. 4 indicates that the two components together serve the enhanced job scheduling according to some embodiments in the present disclosure. According to some embodiments in the present disclosure, the utilization evaluator 404 may be coupled to the job scheduler 405 and the job manager 402 (as is shown in FIG. 4), and according to some other embodiments in the present disclosure, the utilization evaluator 404 may be configured as a component within the job scheduler 405.

According to some embodiments in present disclosure, the one or more resource pools 406 may be configured for flexible management of resources in the exemplary system 400. The one or more resource pools 406 may be configured as a logical abstraction of the resources in the exemplary system 400 and can be grouped into hierarchies and used to hierarchically partition available resources, e.g., CPU and memory. The one or more resource pools 406 may compartmentalize all resources in the exemplary system 400 for flexible management. According to some embodiments in present disclosure, the one or more resource pools 406 may together be consisted in a parent resource pool, as its child resource pools. The one or more resource pools 406 may be coupled to the job scheduler 405 such that the job scheduler may schedule jobs by mapping them to suitable available resources located in the one or more resource pools 406.

Also shown in FIG. 4 are the predefined policy 407 information and the utilization score 408 information (shown with dashed lines), which serves as the information used by the job scheduler 405 to schedule jobs. As shown in FIG. 4, the predefined policy 407 information comprises the designation of share ratios for resources to each user of the system 400, e.g., based on a fair-share policy. The predefined policy 407 information functions as a base for the job scheduler 405 when scheduling jobs. Also shown in FIG. 4, the utilization score 408 information comprises the resource utilization scores for each user of the system 400 calculated by the utilization evaluator 404, which functions as a factor to dynamically adjust the job scheduling strategy for the job scheduler 405 when scheduling jobs. The use of the resource utilization scores takes into account the differences in respective utilization efficiencies against allocated resources for different jobs (submitted by different users), therefore may provide enhanced scheduling with better resource utilization efficiencies.

In the following, details of the interactions among the job manager 402, the utilization evaluator 404, and the job scheduler 405 will be discussed with reference to FIGS. 5A and 5B, which depict, respectively, an exemplary data flow among the above-mentioned components according to some embodiments in the present disclosure and an exemplary resource utilization score table calculated according to some embodiments in the present disclosure.

Figures 5A, 5B:
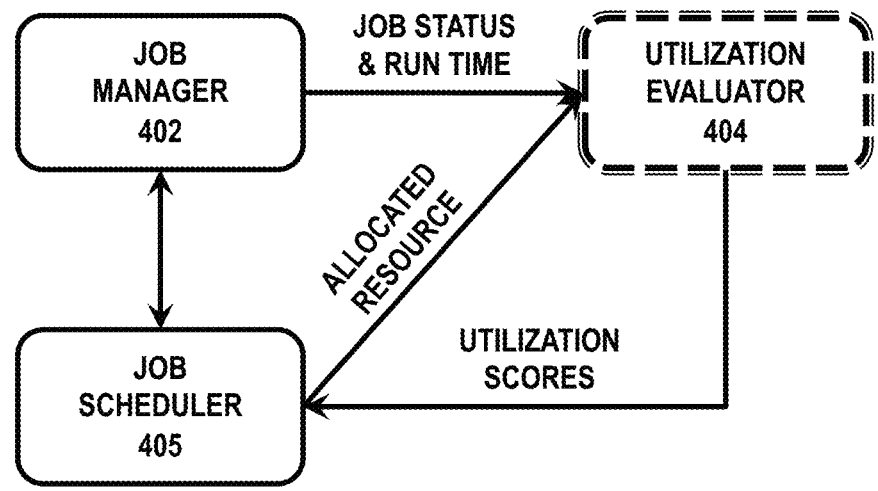
FIG. 5A depicts an exemplary data flow of among several components of the exemplary system of FIG. 4 according to some embodiments in the present disclosure.
FIG. 5B depicts an exemplary resource utilization score table calculated according to some embodiments in the present disclosure.

Referring now to FIG. 5A, which depicts an exemplary data flow among the job manager 402, the utilization evaluator 404 and the job scheduler 405. According to some embodiments in the present disclosure, as the resource utilization scores are calculated for each user by considering resource utilization efficiency at the job level, the utilization evaluator 404 may be configured to collect from the job manager 402, job status data and job run time data for each job managed by the job manager 402 that is with a final state. The data can be easily obtained due to the fact that such data are actually maintained and managed by the job manager 402. According to some embodiments in the present disclosure, the utilization evaluator 404 may request the data via an API provided by the job manager 402, alternatively, the job manager 402 may provide the data to the utilization evaluator 404 periodically. The job status data and job run time data for each job that is with a final state may be collected for a given period of time, e.g., for a previous hour, previous two hours, a previous day, a previous week, etc. As aforementioned, although here job status and job run time data are collected as resource utilization data, any other types of resource utilization data at the job level may be utilized.

According to some embodiments in the present disclosure, the utilization evaluator 404 may be configured to collect allocated resource time for each job that is with a final state from the job scheduler 405. The allocated resource time for each job that is with a final state can be easily obtained due to the fact that such data are actually maintained and managed by the job scheduler 405. According to some embodiments in the present disclosure, the utilization evaluator 404 may request the allocated resource time for each job that is with a final state via an API provided by the job scheduler 405, alternatively, the job scheduler 405 may provide the allocated resource time for each job that is with a final state to the utilization evaluator 404 periodically. The allocated resource time for each job that is with a final state may be collected for a given period of time, e.g., for a previous hour, previous two hours, a previous day, a previous week, etc. Also, although here allocated resource time for each job that is with a final state is collected as resource utilization data, any other types of resource utilization data at the job level may be utilized.

According to some embodiments in the present disclosure, the utilization evaluator 404 may be configured to calculate respective job level resource utilization efficiencies for the one or more users. A job level resource utilization efficiency for a job that is with a final state may be calculated based on the following formula shown as Formula (1).

$$Job_{efficiency} = Job_{status} * \frac{Runtime(job)}{AllocatedResourceTime(job)} \quad \text{Formula (1)}$$

$$\text{where } Job_{status} = \begin{pmatrix} 1, & \text{job successfully completed} \\ 0, & \text{job failed or aborted} \end{pmatrix}$$

In the above Formula (1), Runtime(job) represents the actual run time for a job collected by the utilization evaluator 404, AllocatedResourceTime(job) represents the allocated resource time for the job, and the above formula regulates that if a job has been completed successfully (with a job state as successfully completed) using its allocated resources, the resource utilization efficiency for the job may be calculated as the run time of the job divided by the allocated resource time for the job. If a job fails in the end (with a job state as failed) or fails to run with its allocated resources in the end (with a job state as aborted), the resource utilization efficiency for the job may be assigned as zero, due to the fact that the allocated resources for the job have not been utilized efficiently (as the job fails), or the allocated resources for the job are in vain (as the job fails to run in the end). For each job of a user for the give period of time, corresponding resource utilization efficiency may be calculated and an average of resource utilization efficiencies for all the jobs of the user that are with final states within the given period of time may be calculated as the resource utilization score for the user (for the given period of time). The resource utilization score for the user (for the given period of time) may be represented as Formula (2) in below.

$$UserA_{ResUtScore} = \frac{\sum_{1}^{n} Job_{efficiency(i)}}{n} \quad \text{Formula (2)}$$

where n=the number of jobs of user A for the given period of time that have final states In the above Formula (2), $UserA_{ResUtScore}$ represents the resource utilization score of User A, n is the number of jobs of user A that have final states for the given period of time.

FIG. 5B depicts an exemplary resource utilization score table calculated according to some embodiments in the present disclosure. The exemplary resource utilization score table shown in FIG. 5B depicts calculated resource utilization scores for jobs identified by UserID and JobID. For example, for the first record, i.e., job 1 of User A is with a final state that indicates it is successfully completed (UserID=A, JobID=1, Job Status=1), the resource utilization score for the job 1 of User A equals to 1*170/200=0.85. For the third record, i.e., job 3 of User B is with a final state that indicates it is failed or aborted (UserID=B, JobID=3, Job Status=0), the utilization score for the job 3 of User B equals to 0*200/300=0. With the resource utilization scores of all the jobs of a user that are with final states (for a given period of time) calculated, an average of resource utilization efficiencies for all the jobs of the user that are with final states within the given period of time may be calculated as the resource utilization score for the user (for the given period of time).

According to some embodiments in the present disclosure, the utilization evaluator 404 may further calculate the resource utilization score over time for the user based on time attenuations. For example, the resource utilization score for the user may be calculated according to the formula below shown as Formula (3).

$$UserA_{ResUtScoreTime} = e^{UserA_{ResUtScoreT1}} * a + e^{UserA_{ResUtScoreT2}} * b + \quad \text{Formula (3)}$$

In the above Formula (3), $UserA_{ResUtScoreTime}$ represents the resource utilization score of User A considering time attenuations, e represents the exponential constant, $UserA_{ResUtScoreT1}$, $UserA_{ResUtScoreT2}$, ..., each represents the resource utilization score of User A in a given period of time T1, T2, ..., and a, b, ... each represents a time attenuation factor that may be pre-determined based on domain knowledge, or with cognitive approaches using machine learning. According to some embodiments in the present disclosure, T1<T2<..., and a>b>..., which means, the value of the time attenuation factor decreases with the length of the given period of time. The longer the give period of time is, the smaller is the value of the time attenuation factor. For example, the value of the time attenuation factor for an hour is larger than the value of the time attenuation factor for a day. The decrease of the value may reflect that the influence for a longer period contributes less than the influence for a short period of time when calculating the resource utilization score for the user.

According to some embodiments in the present disclosure, the utilization evaluator 404 may further be configured to send the calculated resource utilization scores for the one or more users to the job scheduler 405. Responsive to the receipt of the resource utilization scores for the one or more users, the job scheduler may be configured to dynamically adjust the job scheduling. According to some embodiments in the present disclosure, the job scheduler 405 may adjust the share ratio for each of the one or more users according to the Formula (4) in below.

$$UserA_{AdjustedShareRatio} = UserA_{ShareRatio} * (\log_a UserA_{ResUtScoreTime} + b)(a>0, b>0) \quad \text{Formula (4)}$$

In the above Formula (4), $UserA_{AdjustedShareRatio}$ represents the adjusted share ratio for User A, $UserA_{ShareRatio}$ represents the share ratio for User A determined by the predefined policy, and $UserA_{ResUtScoreTime}$ represents the calculated resource utilization score and it may be with or without considering time attenuations. A, b are coefficients that may be set to corresponding default values or may be customized by an administrator of the system based on the domain knowledge or experiences. The coefficients a, b may also be determined with cognitive approaches using machine learning.

With the adjusted share ratios for different users, the job scheduler 405 may be configured to schedule jobs submitted from different users based on corresponding adjusted share ratios. By doing so, differences in respective utilization efficiencies against allocated resources for different jobs submitted from different users may be considered aside from the predefined policy, therefore better scheduling may be achieved by allocating more resources to the user that can better utilize the allocated resources.

Figure 6:
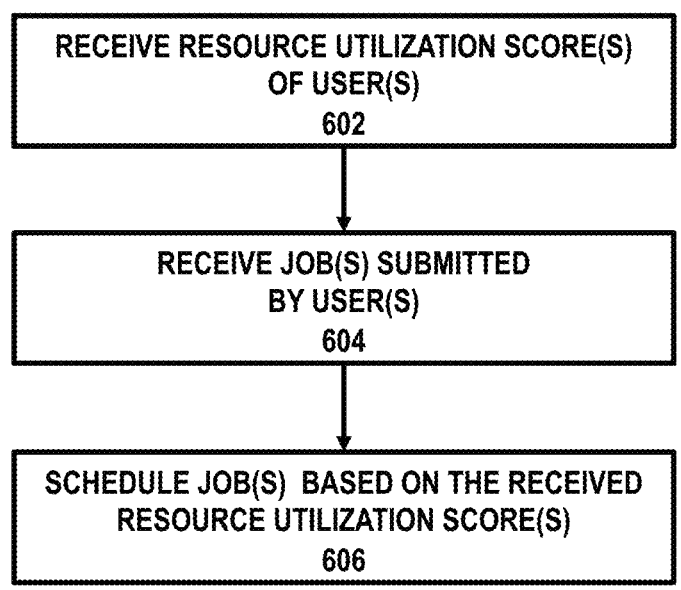
FIG. 6 depicts an exemplary flow diagram according to some embodiments in the present disclosure.

Referring now to FIG. 6, which depicts an exemplary flow diagram according to some embodiments in the present disclosure. In FIG. 6, a computer-implemented method 600 for job scheduling in a computing system is provided. According to some embodiments in the present disclosure, computing resources of the computing system may be allocated to one or more users of the computing system using a predefined policy. According to some embodiments in the present disclosure, the computing system may be the cloud computing environment in FIG. 2. According to some embodiments in the present disclosure, the computing system may also be the exemplary system 400 in FIG. 4.

At step 602 of the computer-implemented method 600, one or more resource utilization scores of the one or more users may be received by a job scheduler associated with the computing system, e.g., the job scheduler 405 in FIG. 4. The one or more resource utilization scores may indicate resource utilization efficiency over time at the job level for the one or more users.

At step 604 of the computer-implemented method 600, one or more jobs submitted by the one or more users may be received by the job scheduler, e.g., the job scheduler 405 in FIG. 4.

At step 606 of the computer-implemented method 600, the received one or more jobs may be scheduled by the job scheduler, e.g., the job scheduler 405 in FIG. 4, based on the predefined policy and further on the received one or more resource utilization scores of the one or more users.

According to some embodiments in the present disclosure, the one or more resource utilization scores of the one or more users are calculated based on respective resource utilization efficiencies of successfully completed jobs of the one or more users.

According to some embodiments in the present disclosure, the respective resource utilization efficiencies of successfully completed jobs of the one or more users are calculated based on collected metadata for the successfully completed jobs including job run time and corresponding resource allocation information.

According to some embodiments in the present disclosure, the one or more resource utilization scores of the one or more users are calculated further based on respective attenuations over time.

According to some embodiments in the present disclosure, the resource utilization efficiency of a job is assigned as 0 if a) the job failed, or b) the job failed to run for corresponding assigned resource(s).

According to some embodiments in the present disclosure, the scheduling of the received one or more jobs comprises allocating, by the job scheduler, resources for the received one or more jobs further based on the received one or more resource utilization scores of the one or more users to avoid over-allocation or starvation.

According to some embodiments in the present disclosure, wherein the scheduling of the received one or more jobs comprises adjusting, by the job scheduler, the predefined policy with the received one or more resource utilization scores.

Embodiments of the present disclosure have been described in the above. It should be noted that the job scheduling according to embodiments of this disclosure could be implemented by computer system/server 12 of FIG. 1.

Embodiments of the present disclosure may be a system, a method, and/or a computer program product at any possible technical detail level of integration. The computer program product may include a computer readable storage medium (or media) having computer readable program instructions thereon for causing a processor to carry out aspects of embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present disclosure.

Aspects of embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for job scheduling in a computing system, wherein computing resources of the computing system are allocated to one or more users of the computing system using a predefined policy, the method comprising:
    receiving, by a job scheduler of the computing system, a resource utilization score of each of the one or more users, wherein
        the resource utilization score of each user is calculated based on resource utilization efficiencies of successfully completed jobs of that user and respective attenuations over time,
        the resource utilization score for each user indicates resource utilization efficiency over time at a job level for that user,
        the resource utilization score for each user is defined as $ResUtScore = \sum_{t=1}^{n} A_t e^{ResUtScore_t}$,
        n is a number of time periods, $A_t$ is a time attenuation factor for the $t^{th}$ time period, and $ResUtScore_t$ is a resource utilization score for that user during the $t^{th}$ time period,
        the $t^{th}$ time period occurred more recently than the $(t+1)^{th}$ time period, and
        $A_t$ is greater than $A_{t+1}$;
    receiving, by the job scheduler, one or more jobs submitted by the one or more users; and
    scheduling, by the job scheduler, the received one or more jobs based on the predefined policy and further on the received resource utilization score for each of the one or more users, wherein said scheduling comprises:
        allocating the computing resources of the computing system to the one or more users based on the predefined policy and further on the received resource utilization score for each of the one or more users.

2. The computer-implemented method of claim 1, wherein the respective resource utilization efficiencies of successfully completed jobs of the one or more users are calculated based on collected metadata for the successfully completed jobs including job run time and corresponding resource allocation information.

3. The computer-implemented method of claim 1, further comprising:
    assigning a resource utilization efficiency to a job in response to the job failing, or the job failing to run for corresponding assigned resource(s).

4. The computer-implemented method of claim 1, wherein the scheduling of the received one or more jobs comprises:
- allocating, by the job scheduler, resources for the received one or more jobs further based on the received one or more resource utilization scores of the one or more users to avoid over-allocation or starvation.

5. The computer-implemented method of claim 4, wherein the scheduling of the received one or more jobs comprises:
- adjusting, by the job scheduler, the predefined policy with the received one or more resource utilization scores.

6. A system for job scheduling in a computing system, wherein computing resources of the computing system are allocated to one or more users of the computing system using a predefined policy, the system comprising:
- a computing node comprising a computer readable storage medium having program instructions embodied therewith, the program instructions executable by one or more processing units of the computing node to cause the one or more processing units to:
- receive a resource utilization score of each of the one or more users, wherein
  - the resource utilization score of each user is calculated based on resource utilization efficiencies of successfully completed jobs of that user and respective attenuations over time,
  - the resource utilization score for each user indicates resource utilization efficiency over time at a job level for that user,
  - the resource utilization score for each user is defined as $ResUtScore = \Sigma_{t-1}^{n} A_t e^{ResUtScore_t}$,
  - n is a number of time periods, $A_t$ is a time attenuation factor for the $t^{th}$ time period, and $ResUtScore_t$ is a resource utilization score for that user during the $t^{th}$ time period,
  - the $t^{th}$ time period occurred more recently than the $(t+1)^{th}$ time period, and
  - $A_t$ is greater than $A_{t+1}$;
- receive one or more jobs submitted by the one or more users; and
- schedule the received one or more jobs based on the predefined policy and further on the received resource utilization score for each of the one or more users, wherein said scheduling comprises:
  - allocating the computing resources of the computing system to the one or more users based on the predefined policy and further on the received resource utilization score for each of the one or more users.

7. The system of claim 6, wherein the respective resource utilization efficiencies of successfully completed jobs of the one or more users are calculated based on collected metadata for the successfully completed jobs including job run time and corresponding resource allocation information.

8. The system of claim 6, further comprising:
- assigning a resource utilization efficiency to a job in response to the job failing, or the job failing to run for corresponding assigned resource(s).

9. The system of claim 6, wherein the scheduling of the received one or more jobs comprises:
- allocating resources for the received one or more jobs further based on the received one or more resource utilization scores of the one or more users to avoid over-allocation or starvation.

10. The system of claim 9, wherein the scheduling of the received one or more jobs comprises:
- adjusting the predefined policy with the received one or more resource utilization scores.

11. A computer program product for job scheduling in a computing system, wherein computing resources of the computing system are allocated to one or more users of the computing system using a predefined policy, the computer program product comprising a non-transitory computer readable storage having program instructions embodied therewith and the program instructions comprising:
- program codes configured to:
  - receive, by a job scheduler of the computing system, a resource utilization score of each of the one or more users, wherein
    - the resource utilization score of each user is calculated based on resource utilization efficiencies of successfully completed jobs of that user and respective attenuations over time,
    - the resource utilization score for each user indicates resource utilization efficiency over time at a job level for that user,
    - the resource utilization score for each user is defined as $ResUtScore = \Sigma_{t-1}^{n} A_t e^{ResUtScore_t}$,
    - n is a number of time periods, $A_t$ is a time attenuation factor for the $t^{th}$ time period, and $ResUtScore_t$ is a resource utilization score for that user during the $t^{th}$ time period,
    - the $t^{th}$ time period occurred more recently than the $(t+1)^{th}$ time period, and
    - $A_t$ is greater than $A_{t+1}$;
  - receive, by the job scheduler, one or more jobs submitted by the one or more users; and
  - schedule, by the job scheduler, the received one or more jobs based on the predefined policy and further on the received resource utilization score for each of the one or more users, wherein said scheduling comprises:
    - allocating the computing resources of the computing system to the one or more users based on the predefined policy and further on the received resource utilization score for each of the one or more users.

12. The computer program product of claim 11, wherein the respective resource utilization efficiencies of successfully completed jobs of the one or more users are calculated based on collected metadata for the successfully completed jobs including job run time and corresponding resource allocation information.

13. The computer program product of claim 11, further comprising:
- assigning a resource utilization efficiency to a job in response to the job failing, or the job failing to run for corresponding assigned resource(s).

14. The computer program product of claim 11, wherein the program instructions comprising:
- program codes configured to allocate resources for the received one or more jobs further based on the received one or more resource utilization scores of the one or more users to avoid over-allocation or starvation.

* * * * *